United States Patent
Christensen et al.

(10) Patent No.: US 7,766,751 B2
(45) Date of Patent: Aug. 3, 2010

(54) TORQUE LIMITING DEVICES FOR ACTUATORS

(75) Inventors: Donald J. Christensen, Phoenix, AZ (US); Brian Jardine, Scottsdale, AZ (US); Don L. Mittendorf, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 419 days.

(21) Appl. No.: 11/858,709

(22) Filed: Sep. 20, 2007

(65) Prior Publication Data
US 2009/0078524 A1  Mar. 26, 2009

(51) Int. Cl.
F16D 9/02 (2006.01)
(52) U.S. Cl. .......................... 464/31; 464/38
(58) Field of Classification Search .............. 464/31, 464/38, 44, 48
See application file for complete search history.

(56) References Cited

U.S. PATENT DOCUMENTS

| | | | |
|---|---|---|---|
| 1,043,111 A * | 11/1912 | King et al | 464/48 |
| 2,140,723 A * | 12/1938 | Spicer | 464/31 |
| 2,732,746 A | 1/1956 | Livermont | |
| 2,778,246 A * | 1/1957 | Thornton | 464/38 X |
| 3,185,275 A | 5/1965 | Orwin | |
| 3,662,628 A | 5/1972 | Schnepel | |
| 3,724,815 A | 4/1973 | Hawkins et al. | |
| 3,770,086 A | 11/1973 | Jackson et al. | |
| 3,862,641 A | 1/1975 | Follett | |
| 4,007,818 A | 2/1977 | Orwin | |
| 4,080,567 A | 3/1978 | Kemp et al. | |
| 4,257,500 A | 3/1981 | Brunner | |
| 4,262,501 A | 4/1981 | Vaughn et al. | |
| 4,263,996 A | 4/1981 | Putney | |
| 4,286,441 A | 9/1981 | Scheneman, Jr. et al. | |
| 4,317,511 A | 3/1982 | Asai | |
| 4,605,111 A | 8/1986 | Ohno et al. | |
| 5,855,517 A | 1/1999 | Lepold | |
| 5,916,325 A | 6/1999 | Madrid et al. | |
| 6,105,597 A | 8/2000 | Willetts | |
| 6,132,435 A | 10/2000 | Young | |
| 6,832,533 B1 | 12/2004 | Huang | |
| 7,052,239 B1 | 5/2006 | Riske | |
| 7,222,559 B2 | 5/2007 | Wang | |

OTHER PUBLICATIONS

Webster's Dictionary, Literature Online Reference Edition [online]. [retrieved on Jan. 6, 2010].*

* cited by examiner

*Primary Examiner*—Greg Binda
(74) *Attorney, Agent, or Firm*—Ingrassia Fisher & Lorenz, P.C.

(57) ABSTRACT

A torque limiting includes first and second rotational plates, first and second springs, and a slip device. The first rotational plate is coupled to a torque input device. The second rotational plate is coupled to a drive shaft, and is configured to be movable along an axial direction thereof. The first spring has a first free length, and exerts a first spring force against the second rotational plate toward the first rotational plate. The second spring has a second free length, smaller than the first free length, and selectively exerts a second spring force against the second rotational plate toward the first rotational plate. The slip device, disposed at least partially within or between the first and second rotational plates, causes relative motion between the first and second rotational plates when torque overcomes the combined first and second spring forces exerted against the second rotational plate.

20 Claims, 5 Drawing Sheets

TORQUE LIMITING DEVICES FOR ACTUATORS

STATEMENT REGARDING FEDERALLY SPONSORED RESEARCH OR DEVELOPMENT

This invention was made with Government support under contract number N00024-04-C-2118 awarded by the United States Navy. The Government has certain rights in this invention.

TECHNICAL FIELD

The present invention relates generally to actuators and, more particularly, to improved torque limiting devices for actuators.

BACKGROUND

Torque limiting devices are often used to limit an amount of torque applied to an actuator. Torque limiting devices can thereby help prevent or minimize wear or damage that might otherwise result to an actuator or other devices coupled thereto. However, it can be difficult to calibrate torque limiting devices with fine levels of gradation. It can also be difficult for a torque limiting device to have a very broad range of calibrations. Additionally, torque limiting devices could unnecessarily impede proper application of a large amount of torque when required in emergency situations, such as after a fire.

Accordingly, it is desired to provide a torque limiting device for an actuator with improved calibration capabilities, for example allowing fine levels of gradation and/or a broader range of calibrations. It is further desired to provide a torque limiting device that can be automatically disabled, for example in emergency situations such as after a fire. Furthermore, other desirable features and characteristics of the present invention will be apparent from the subsequent detailed description and the appended claims, taken in conjunction with the accompanying drawings and the foregoing technical field and background.

BRIEF SUMMARY

In accordance with an exemplary embodiment of the present invention, a torque limiting device for an actuator having a drive shaft configured to rotate at least in part from torque provided by a user via a torque input device is provided. The torque limiting device comprises a first rotational plate, a second rotational plate, a first spring, a second spring, and a slip device. The first rotational plate is coupled to the torque input device. The second rotational plate is coupled to the drive shaft, and is configured to be movable along an axial direction thereof. The first spring has a first free length, and is configured to exert a first spring force against the second rotational plate toward the first rotational plate. The second spring has a second free length that is smaller than the first free length. The second spring is configured to selectively exert a second spring force against the second rotational plate toward the first rotational plate. The slip device is disposed at least partially within or between the first and second rotational plates. The slip device is configured to at least partially cause relative motion between the first and second rotational plates when the torque provided by the user overcomes the combined first and second spring forces exerted against the second rotational plate.

In accordance with another exemplary embodiment of the present invention, a torque limiting device for an actuator having a drive shaft configured to rotate at least in part from torque provided by a user via a torque input device is provided. The torque limiting device comprises a first rotational plate, a second rotational plate, a spring, a slip device, and a spring carrier. The first rotational plate is coupled to the torque input device. The second rotational plate is coupled to the drive shaft, and is configured to be movable along an axial direction thereof. The spring is configured to exert a spring force against the second rotational plate toward the first rotational plate. The slip device is disposed at least partially between the first and second rotational plates. The slip device is configured to at least partially cause relative motion between the first and second rotational plates when the torque provided by the user overcomes the spring force exerted against the second rotational plate. The spring carrier at least partially surrounds the spring, and comprises a material with a melting point that is at least substantially known. The spring carrier is configured to house the spring when a temperature of the torque limiting device is below the melting point, and to at least substantially disable the spring after the temperature of the torque limiting device has exceeded the melting point.

In accordance with a further exemplary embodiment of the present invention, a torque limiting device for an actuator having a drive shaft configured to rotate at least in part from torque provided by a user via a torque input device is provided. The torque limiting device comprises a first rotational plate, a second rotational plate, a first spring, a second spring, a slip device, and a spring carrier. The first rotational plate is coupled to the torque input device. The second rotational plate is coupled to the drive shaft, and is configured to be movable along an axial direction thereof. The first spring has a first free length, and is configured to exert a first spring force against the second rotational plate toward the first rotational plate. The second spring has a second free length that is smaller than the first free length. The second spring is configured to selectively exert a second spring force against the second rotational plate toward the first rotational plate. The slip device is disposed at least partially between the first and second rotational plates. The slip device is configured to at least partially cause relative motion between the first and second rotational plates when the torque provided by the user overcomes the combined first and second spring forces exerted against the second rotational plate. The spring carrier at least partially surrounds the first and second springs, and comprises a material with a melting point that is at least substantially known. The spring carrier is configured to house the first and second springs when a temperature of the torque limiting device is below the melting point, and to at least substantially disable the first and second springs after the temperature of the torque limiting device has exceeded the melting point.

Other independent features and advantages of the preferred embodiments of the check valves will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background or the following detailed description.

Figure 1:
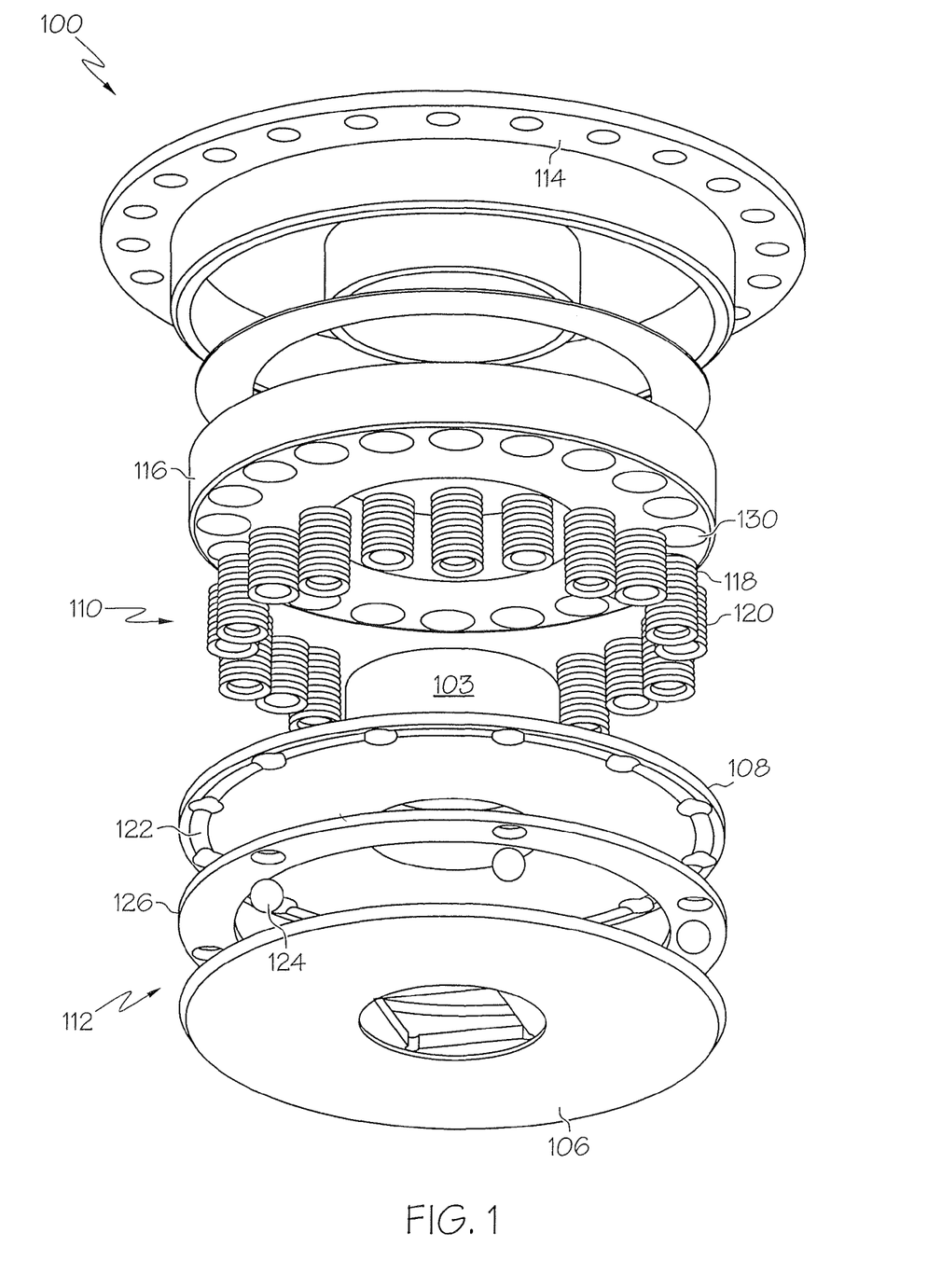
FIG. 1 is an exploded isometric view of a torque limiting device, shown along with a drive shaft connected thereto in accordance with an exemplary embodiment of the present invention.
Figure 2:
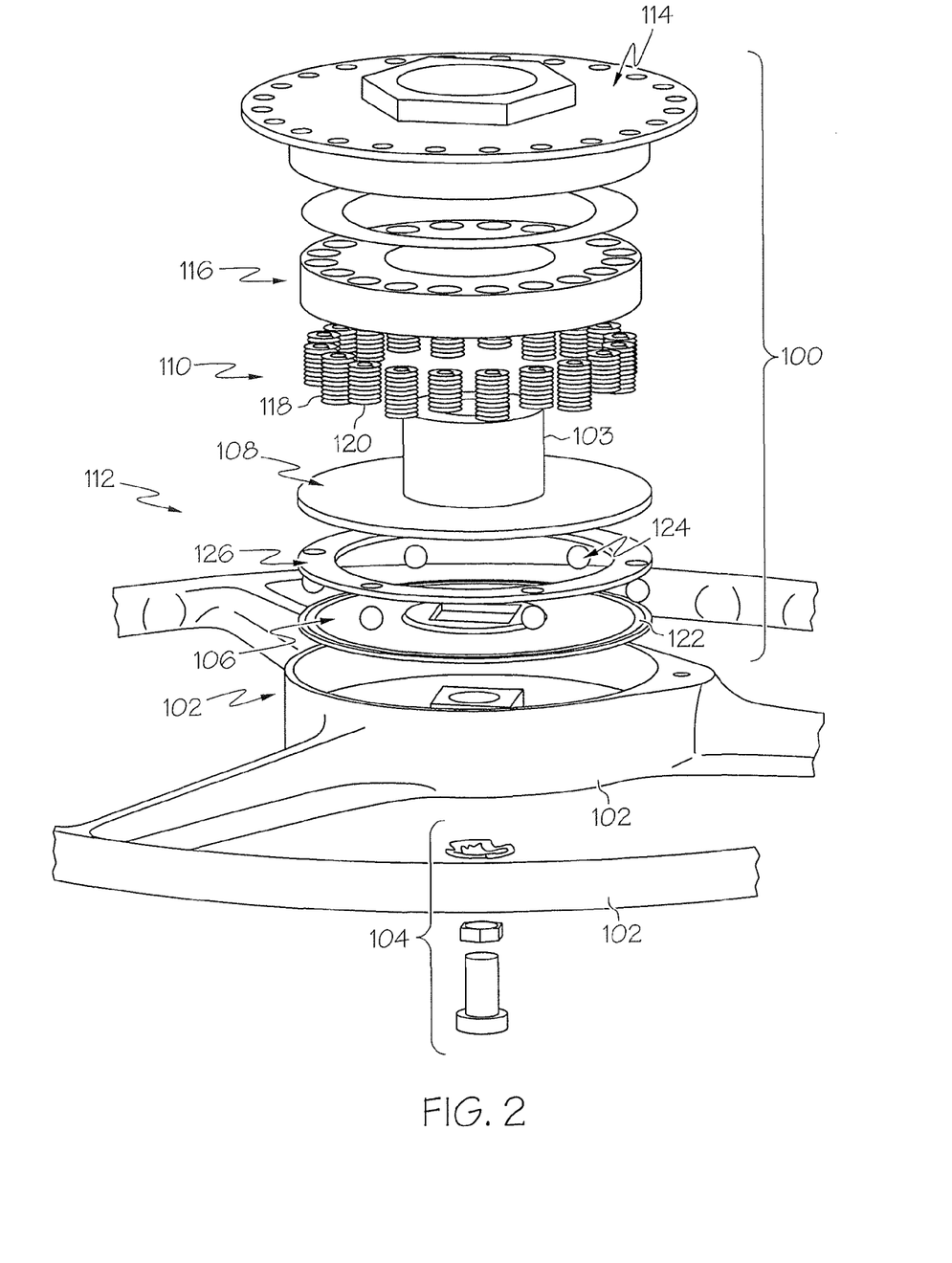
FIG. 2 is an exploded isometric view of a torque limiting device, shown along with a torque insert device coupled thereto, in accordance with another exemplary embodiment of the present invention.
Figure 3:
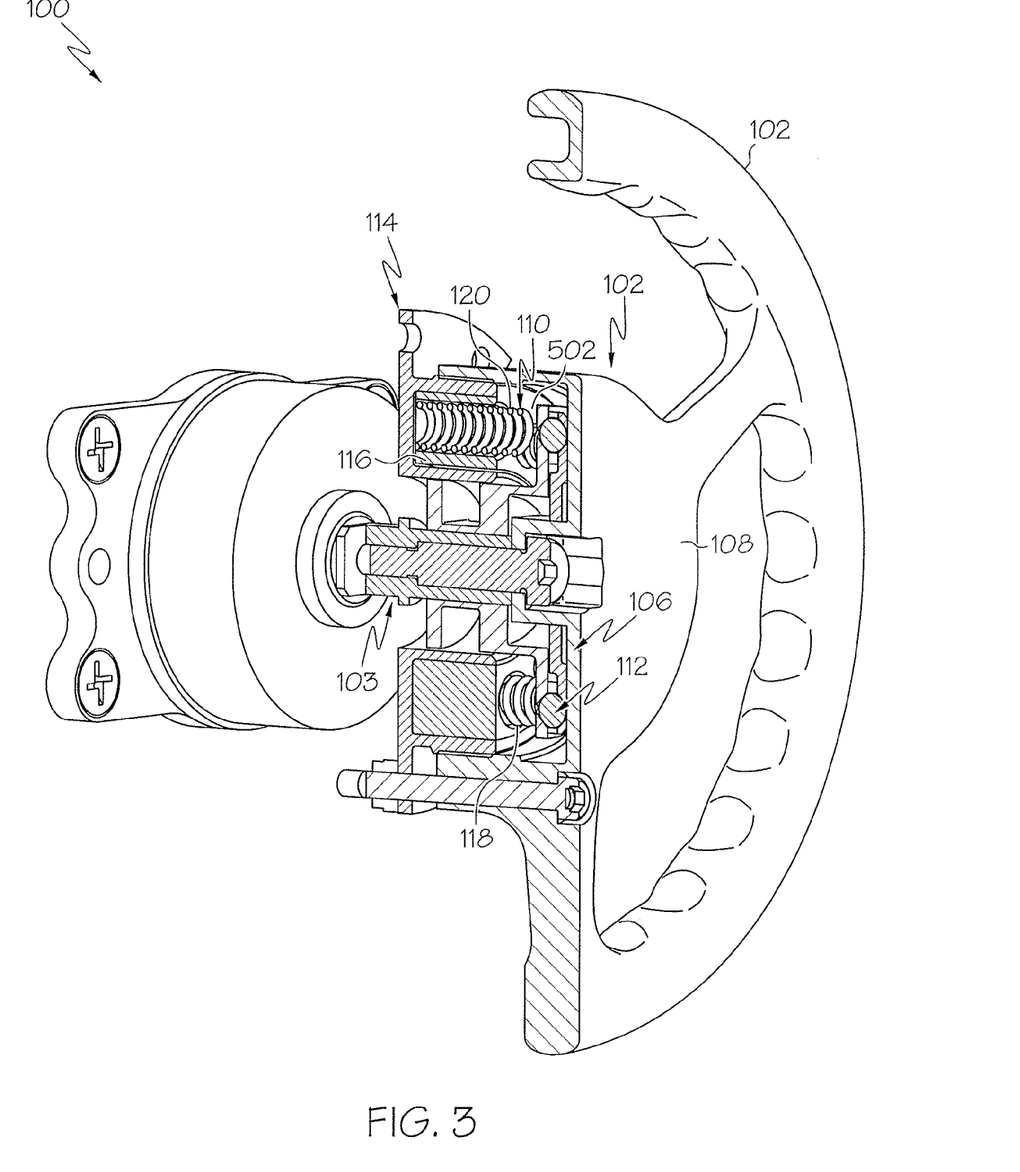
FIG. 3 is a cross-sectional view of a torque limiting device, shown along with a torque insert device coupled thereto, in accordance with an exemplary embodiment of the present invention.

FIGS. 1-3 depict a torque limiting device 100 for limiting torque in an actuator or similar device, in accordance with an exemplary embodiment of the present invention. Specifically, FIG. 1 depicts an exemplary embodiment of the torque limiting device 100 in an exploded isometric view. FIG. 2 depicts another exemplary embodiment of the torque limiting device 100 of FIG. 1, shown in an exploded isometric view along with an exemplary integrated hand wheel 102. FIG. 3 is a cross-sectional view of an exemplary embodiment of the torque limiting device 100, also shown along with an exemplary hand wheel 102.

The torque limiting device 100 can be used in connection with any one of a number of different types of actuators having a rotational drive shaft, such as the drive shaft 103 depicted in FIGS. 1-3. The drive shaft 103 is configured to rotate at least in part from torque provided by a user via a torque input device, such as the above-referenced hand wheel 102 depicted in FIGS. 2 and 3, unless torque is limited by the torque limiting device 100. In a preferred embodiment, the hand wheel 102 comprises a cast metal. In certain embodiments, the torque limiting device 100 can be formed integral with the hand wheel 102 or other torque input device. In other embodiments, the torque limiting device 100 can be attached to the hand wheel 102 or other torque input device via attachment hardware 104, such as screws, nuts, and/or washers, or via various other types of adhesive materials, fastening materials, and/or other joining devices and materials.

As depicted in FIGS. 1-3, the torque limiting device 100 comprises a first rotational plate 106, a second rotational plate 108, a plurality of springs 110, a slip device 112, an adjustment device 114, and a spring carrier 116. The first rotational plate 106 is coupled to the hand wheel 102, and is preferably attached thereto or formed integral therewith. The second rotational plate 108 is coupled to the drive shaft 103, and is configured to be movable along an axial direction thereof. In a preferred embodiment, the first and second rotational plates 106, 108 both comprise a hardened steel material.

The plurality of springs 110 exert spring forces against the second rotational plate 108 urging it towards the first rotational plate 106. As will be discussed in greater detail further below, in a preferred embodiment, the plurality of springs 110 includes at least a first spring 118 exerting a first spring force against the second rotational plate 108 urging it towards the first rotational plate 106, and a second spring 120 selectively exerting a second spring force against the second rotational plate 108 urging it towards the first rotational plate 106. As will also be discussed in greater detail further below, in a preferred embodiment, the first and second springs 118, 120 vary in their respective free lengths, allowing for finer and more accurate calibration of, and a broader range of calibrations for, the torque limiting device 100. In a preferred embodiment, each of the plurality of springs 110 comprises a metallurgical spring alloy based on cobalt, such as Co 40 Ni 15.5 Cr 20 Mo 7 Fe bal Mn 2 C 0.15 B 0.01, which is commonly marketed under the registered trademark Elgiloy.

The slip device 112 is disposed at least partially between the first and second rotational plates 106 and 108. The slip device 112 can refer to any device that is configured to at least partially allow for relative motion between the first and second rotational plates 106, 108 when torque provided by a user overcomes the combined spring forces exerted against the second rotational plate 108 by the plurality of springs 110. Specifically, when torque provided by the user overcomes the combined spring forces exerted against the second rotational plate 108 by the plurality of springs 110, the second rotational plate 108 no longer rotates along with the first rotational plate 106. As a result, during such a period of relative motion, the drive shaft 103 is no longer moved by the torque provided by the user to the hand wheel 102. Accordingly, the torque received by an actuator coupled to the drive shaft 103 is therefore limited by the torque limiting device 100.

As depicted in FIGS. 1 and 2, in a preferred embodiment, the slip device 112 comprises a ball and ramp device. As is known in the art, a ball and ramp device typically comprises a ball ramp 122, a plurality of balls 124, and a ball separator 126. The ball ramp 122 is disposed between the first rotational plate 106 and the second rotational plate 108. In one preferred embodiment, the ball ramp 122 comprises a bronze material. The balls 124 are retained in the ball ramp 122 and roll along the ball ramp 122 when torque is applied by the user. Torque is provided from the first rotational plate 106 to the second rotational plate 108 via the plurality of balls 124 when the torque applied by the user is below a predetermined threshold amount. The ball separator 126 is disposed between the first rotational plate 106 (see FIG. 2) and the second rotational plate 108 (see FIG. 1), and keeps the balls 124 separated as they roll along the ball ramp 122.

When the torque applied by the user exceeds the predetermined threshold amount, the torque overcomes the combined spring force exerted against the second rotational plate 108 by the plurality of springs 110. As a result, the plurality of balls 124 fall out of the ball ramp 122, for example into a nearby hole or channel, and torque is no longer provided from the first rotational plate 106 to the second rotational plate 108 via the plurality of balls 124. As a result, the torque provided by the user through the hand wheel 102 no longer reaches the second rotational plate 108, and the second rotational plate 108 therefore stops. Thus, there is relative motion between the first and second rotational plates 106, 108, and torque is thereby cut off to the drive shaft 103 and any actuators coupled thereto.

The adjustment device 114 is coupled to the plurality of springs 110, and is configured to allow a user or technician to move and adjust tension in the plurality of springs 110, and to thereby adjust the respective spring forces from the plurality of springs 110 against the second rotational plate 108. As a result, the adjustment device 114 allows for calibration of the torque limiting device 100. Specifically, if the springs 110 are moved closer to the second rotational plate 108 and/or are compressed more tightly, the combined spring force exerted by the plurality of springs 110 against the second rotational plate 108 increases, and the torque limiting device 100 is thereby calibrated to limit torque to the drive shaft 103 and any actuators coupled thereto only at relatively higher torque thresholds. Conversely, if the springs 110 are moved farther from the second rotational plate 108 and/or are compressed less tightly, the combined spring force exerted by the plurality of springs 110 against the second rotational plate 108 decreases, and the torque limiting device 100 is thereby calibrated to limit torque to the drive shaft 103 and any actuators coupled thereto at relatively lower torque thresholds. Accordingly, the torque limiting device 100 can thereby be calibrated depending on the type of actuator and/or the type of systems, environments, or conditions in which it is used. In a preferred embodiment, the adjustment device comprises an adjustment nut and screw device made at least in part of a bronze material.

Figure 4:
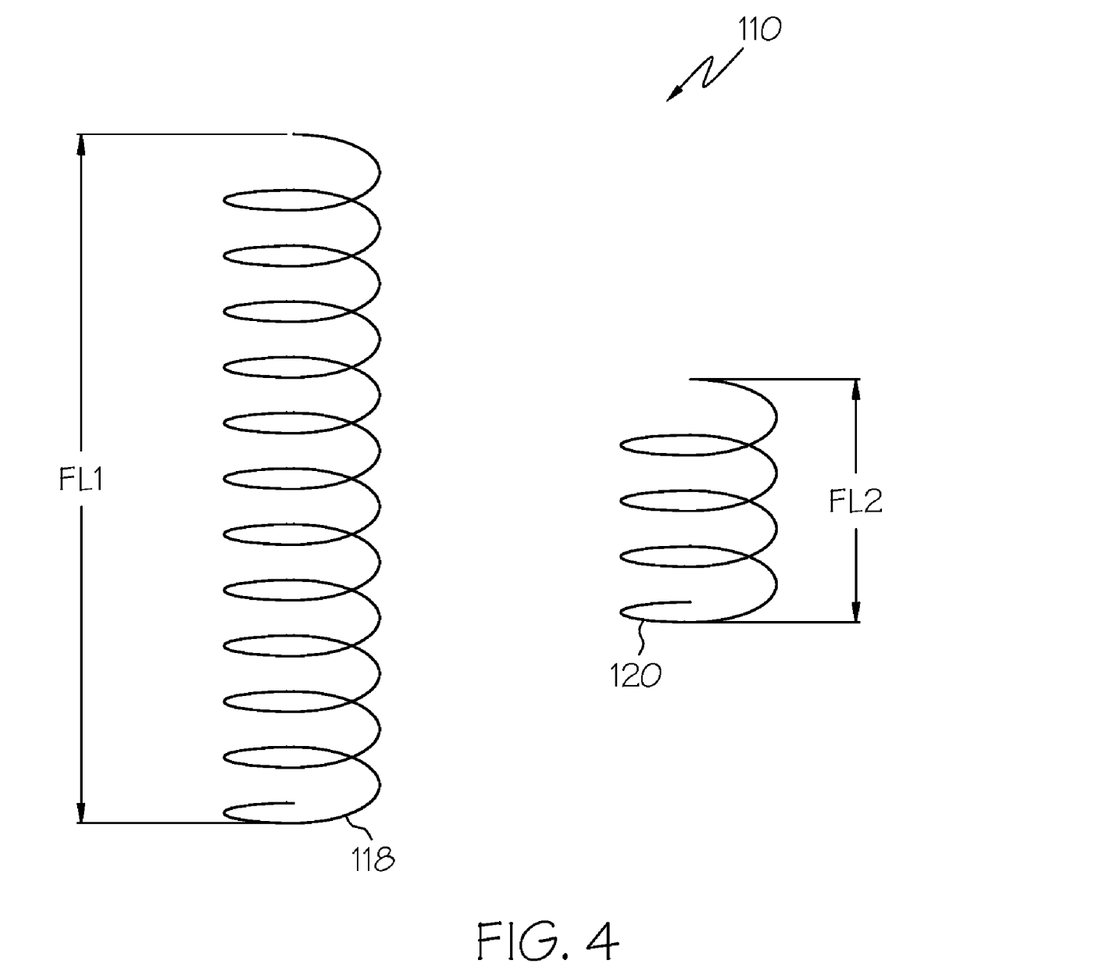
FIG. 4 is a simplified, close-up view of two springs from an exemplary embodiment of a torque limiting device, such as the torque limiting device of FIG. 2, in accordance with an exemplary embodiment of the present invention.

As noted above, in a preferred embodiment, the first and second springs 118, 120 vary in their respective free lengths. For example, FIG. 4 illustrates an exemplary embodiment of a first spring 118 having a free length of FL1 and a second spring 120 having a free length of FL2, with FL1 being greater than FL2. This configuration allows for finer and more accurate calibration of the torque limiting device 100 via the adjustment device 114, and for a broader range of calibrations for the torque limiting device 100. For example, at certain calibrations, the first spring 118 will exert a first spring force against the second rotational plate 108 while the second spring 120 will not exert a second spring force against the second rotational plate 108, because the second spring 120 does not contact the second rotational plate 108 in such calibrations. Alternatively stated, the second spring force can be considered to be equal to zero in such calibrations. In other words, the second spring 120 only exerts a non-zero second spring force against the second rotational plate 108 if the adjustment device 114 is tightened by at least a predetermined threshold amount. Accordingly, the torque limiting device 100 can be calibrated to various fine gradations, along a broader range of calibrations, using the adjustment device 114. This can be done, for example, by adjusting the tension in the plurality of springs 110, as well as by adjusting which of the plurality of springs 110 contact the second rotational plate 108. In addition, in certain embodiments, there may be three or more springs 110 of different free lengths, thereby allowing even finer and more accurate calibration of, and an even broader range of calibrations for, the torque limiting device 100.

Figure 5:
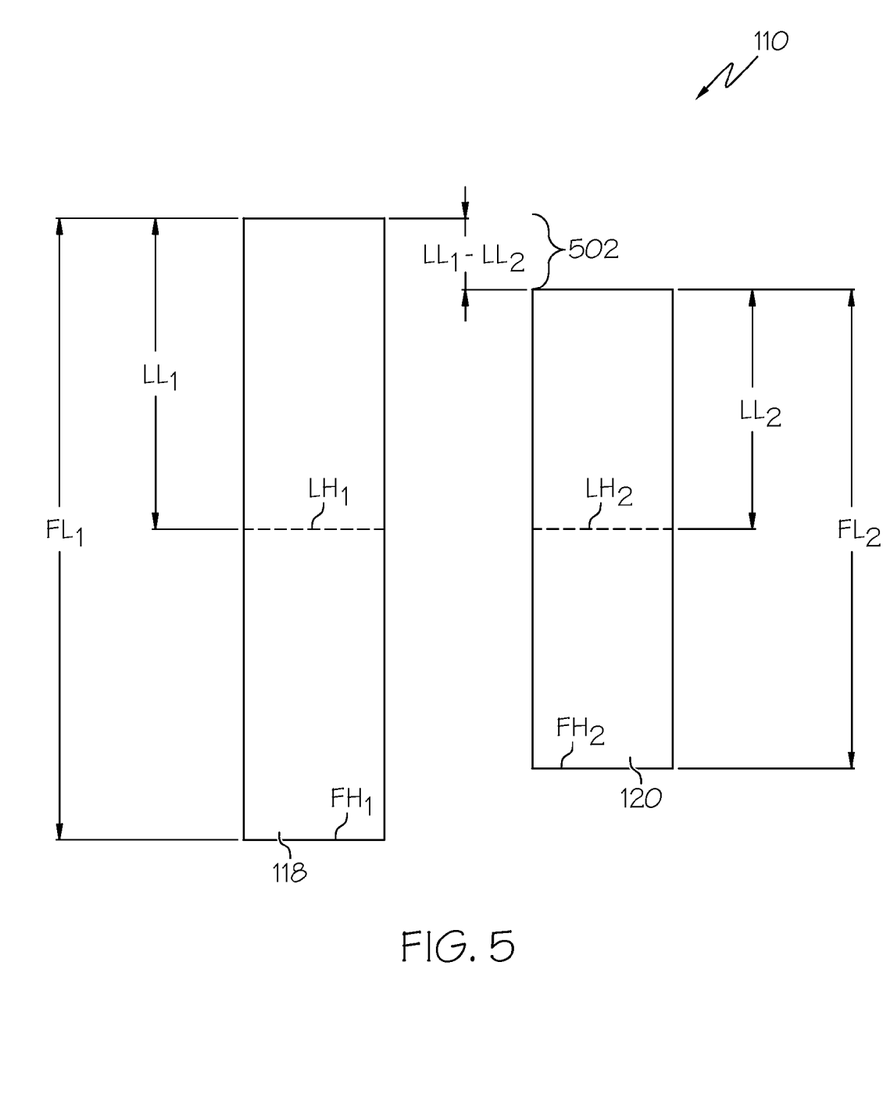
FIG. 5 is another simplified illustration of two springs from an exemplary embodiment of a torque limiting device, such as the torque limiting device of FIG. 2, in accordance with an exemplary embodiment of the present invention.

FIG. 5 is another simplified illustration of a first spring 118 and a second spring 120 that can be used in connection with the torque limiting device 100 in a preferred embodiment. In the depicted embodiment, similar to that of FIG. 4, the first spring 118 has a free length of FL1 and the second spring 120 has a free length of FL2, with FL1 being greater than FL2. Similarly, the first and second springs 118, 120 reach different free heights FH1 and FH2, respectively, when the first and second springs 118, 120 are not fully loaded. Thus, in the depicted embodiment, the first spring 118 is disposed relatively closer to, and the second spring 120 is disposed relatively farther from, the second rotational plate 108 when the springs 110 are not fully compressed.

Additionally, FIG. 5 shows that, in a preferred embodiment, the springs 110 are aligned with an offset 502 such that, when the first and second springs 118, 120 are fully compressed, each of the first and second springs 118, 120 (as well as any additional, non-depicted springs 110) would just reach a common desired loaded height. In other words, when the springs 110 are fully compressed, the offset 502 can be represented by a difference in loaded lengths LL1 and LL2 of the first spring 118 and the second spring 120, respectively, as shown in FIG. 5. Preferably the offset is proximate the spring carrier 116. For example, in certain embodiments, this can be accomplished by a spacer and/or by different sized holes in the spring carrier 116, and/or via other techniques. As a result, in a preferred embodiment, when the springs 110 are fully compressed, the loaded heights LH1 and LH2 of the first and second springs 118, 120, respectively (and of any other non-depicted springs 110) are equal to one another, as shown in FIG. 5. Thus, in this embodiment, when the springs 110 are fully loaded, the first and second springs 118, 120 are both touching, or are an equal length away from, the second rotational plate 108. Accordingly, this alignment allows for maximum spring force when the torque limiting device 100 is actuated at a maximum torque setting. This alignment thereby also further increases the range of calibrations for the torque limiting device 100.

Returning now to FIGS. 1-3, the spring carrier 116 at least partially surrounds the plurality of springs 110. In a preferred embodiment, the spring carrier 116 comprises a material with a known melting point, such that the spring carrier 116 will at least substantially melt after a temperature of the torque limiting device 100 has met or exceeded the melting point, for example after a fire or other emergency. In a preferred embodiment, the spring carrier 116 is configured to house the plurality of springs 110 when the temperature of the torque limiting device 100 is below the melting point, for example via holes 130 of the spring carrier 116 as depicted in FIG. 1.

In addition, in a preferred embodiment, the spring carrier 116 is configured to at least substantially disable the plurality of springs 110 after the temperature of the torque limiting device 100 has exceeded the melting point. Specifically, after the temperature of the torque limiting device 100 has exceeded the melting point, the spring carrier 116 preferably melts at least partially in or around the springs 110 to thereby interfere with the operation of the springs 110, and thus to automatically disable the torque limiting device 100. In one preferred embodiment, the melted spring carrier 116 will then solidify around the plurality of springs 110 when the temperature subsequently drops below the melting point, to continue to interfere with the operation of the springs 110. Accordingly, a user can then apply a large amount of torque, as may be called for in such an emergency event, without interference from the torque limiting device 100. In one preferred embodiment, the spring carrier 116 comprises a zinc alloy. However, in other embodiments, the spring carrier 116 may comprise any number of other materials or combinations thereof, such as various other types of eutectic alloys and/or plastics, among other possible materials having a melting point that is at least substantially known.

Having now described various structural features of an exemplary embodiment of the torque limiting device 100, a brief description of the operation of an exemplary embodiment of the torque limiting device 100 will now be provided. As a user provides torque to the hand wheel 102 in an amount that is below a predetermined threshold amount, torque is provided from the first rotational plate 106 to the second rotational plate 108 via the plurality of balls 124. The first and second rotational plates 106, 108 rotate together along with the hand wheel 102, thereby also resulting in rotation of the drive shaft 103 connected to an actuator. Meanwhile, the plurality of springs 110 exerts a combined spring force against the second rotational plate 108 urging it towards the first rotational plate 106 in an amount that overcomes the torque supplied by the user.

When torque provided by the user exceeds the predetermined threshold, the torque overcomes the combined spring forces exerted against the second rotational plate 108 by the plurality of springs 110. As a result, the plurality of balls 124 fall out of the ball ramp 122, for example into a nearby hole or channel, and torque is no longer provided from the first rotational plate 106 to the second rotational plate 108 via the plurality of balls 124. Consequently, there is relative motion between the first and second rotational plates 106, 108, and the second rotational plate 108 no longer rotates along with the first rotational plate 106 and the hand wheel 102. As a result, during this period of relative motion, the drive shaft 103 is no longer moved by the hand wheel 102, and torque is cut off from any actuators coupled thereto.

The above-referenced predetermined threshold amount of torque for triggering torque limiting can be adjusted based on the calibration of the plurality of springs 110 using the adjustment device 114. If there is a desire to reduce the predetermined threshold amount of torque for triggering torque limiting, then the adjustment device 114 is loosened, so that tension in the plurality of springs 110 is reduced and/or one or more of the plurality of springs 110 are moved farther away from the second rotational plate 108. Conversely, if there is a desire to increase the predetermined threshold amount of torque for triggering torque limiting, then the adjustment device 114 is tightened, so that tension in the plurality of springs 110 is increased and/or one or more of the plurality of springs 110 are moved closer to the second rotational plate 108.

As described in greater detail above, the use of multiple springs 110 having different free lengths in a preferred embodiment provides for even finer and more accurate calibration of, and an even broader range of calibrations for, the torque limiting device 100, using the adjustment device 114. For example, the number of springs 110 exerting a non-zero spring force against the second rotational plate 108 can be adjusted by tightening or loosening the adjustment device 114. Additionally, also as described in greater detail below, in a preferred embodiment the spring carrier 116 will melt at a predetermined temperature, thereby at least substantially disabling the plurality of springs 110 and thus allowing additional torque to be applied in such emergency situations without interference from the torque limiting device 100.

Accordingly, there has been provided a torque limiting device 100 for an actuator with improved calibration capabilities, for example allowing fine levels of gradation and a broader range of calibrations. The torque limiting device 100 can also be automatically disabled, for example in emergency situations such as after a fire. While depicted as used in connection with a hand wheel 102, it will be appreciated that the torque limiting device 100 can be used with any number of different types of torque input devices. It will also be appreciated that the torque limiting device 100 can be used in connection with any number of numerous different types of actuators, devices, systems, and environments.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A torque limiting device for an actuator having a drive shaft configured to rotate at least in part from torque provided by a user via a torque input device, the torque limiting device comprising:
   a first rotational plate coupled to the torque input device;
   a second rotational plate coupled to the drive shaft and configured to be movable along an axial direction thereof;
   a first spring configured to exert a first spring force against the second rotational plate toward the first rotational plate;
   a second spring configured to selectively exert a second spring force against the second rotational plate toward the first rotational plate; and
   a slip device disposed at least partially within or between the first and second rotational plates, the slip device configured to at least partially cause relative motion between the first and second rotational plates when the torque provided by the user overcomes the combined first and second spring forces exerted against the second rotational plate; and
   a spring carrier at least partially surrounding the spring, the spring carrier comprising a material with a melting point that is at least substantially known, the spring carrier configured to:
     house the spring when a temperature of the torque limiting device is below the melting point; and
     at least substantially disable the spring after the temperature of the torque limiting device has exceeded the melting point.

2. The torque limiting device of claim 1, wherein the slip device comprises a ball and ramp device.

3. The torque limiting device of claim 1, further comprising:
   an adjustment device coupled to the first and second springs and configured to allow the user to move the first and second springs, and to thereby adjust the first and second spring forces.

4. The torque limiting device of claim 3, wherein the adjustment device is configured to allow adjustment of tension in one or both of the first and second springs.

5. The torque limiting device of claim 3, wherein the second spring only exerts the second spring force against the second rotational plate if the adjustment device is tightened by at least a predetermined threshold amount.

6. The torque limiting device of claim 3, wherein the adjustment device comprises a nut and a screw.

7. The torque limiting device of claim 1, wherein the torque input device comprises a hand wheel.

8. The torque limiting device of claim 1, wherein:
   the first spring has a first free length;
   the second spring has a second free length; and
   the second free length is smaller than the first free length.

9. The torque limiting device of claim 8, wherein the spring carrier comprises a eutectic alloy.

10. A torque limiting device for an actuator having a drive shaft configured to rotate at least in part from torque provided by a user via a torque input device, the torque limiting device comprising:
   a first rotational plate coupled to the torque input device;
   a second rotational plate coupled to the drive shaft and configured to be movable along an axial direction thereof;
   a spring configured to exert a spring force against the second rotational plate toward the first rotational plate;

a slip device disposed at least partially between the first and second rotational plates, the slip device configured to at least partially cause relative motion between the first and second rotational plates when the torque provided by the user overcomes the spring force exerted against the second rotational plate; and a spring carrier at least partially surrounding the spring, the spring carrier comprising a material with a melting point that is at least substantially known, the spring carrier configured to:

house the spring when a temperature of the torque limiting device is below the melting point; and at least substantially disable the spring after the temperature of the torque limiting device has exceeded the melting point.

11. The torque limiting device of claim 10, wherein the slip device comprises a ball and ramp device.

12. The torque limiting device of claim 10, wherein the spring carrier comprises a eutectic alloy.

13. The torque limiting device of claim 10, wherein the spring carrier comprises a plastic.

14. The torque limiting device of claim 10, wherein the spring carrier comprises a zinc alloy.

15. The torque limiting device of claim 10, wherein the spring has a first free length, and the torque limiting device further comprises:

a second spring having a second free length, the second free length being smaller than the first free length;

wherein the second spring is configured to selectively exert a second spring force against the second rotational plate toward the first rotational plate.

16. The torque limiting device of claim 15, further comprising:

an adjustment device coupled to the spring and to the second spring and configured to allow the user to move the spring and the second spring, and to thereby adjust the spring force and the second spring force, respectively;

wherein the second spring only exerts the second spring force against the second rotational plate if the adjustment device is tightened by at least a predetermined threshold amount.

17. The torque limiting device of claim 10, wherein the torque input device comprises a hand wheel.

18. A torque limiting device for an actuator having a drive shaft configured to rotate at least in part from torque provided by a user via a torque input device, the torque limiting device comprising:

a first rotational plate coupled to the torque input device;

a second rotational plate coupled to the drive shaft and configured to be movable along an axial direction thereof;

a first spring having a first free length, the first spring configured to exert a first spring force against the second rotational plate toward the first rotational plate;

a second spring having a second free length, the second free length being smaller than the first free length, wherein the second spring is configured to selectively exert a second spring force against the second rotational plate toward the first rotational plate;

a slip device disposed at least partially between the first and second rotational plates, the slip device configured to at least partially cause relative motion between the first and second rotational plates when the torque provided by the user overcomes the combined first and second spring forces exerted against the second rotational plate; and a spring carrier at least partially surrounding the first and second springs, the spring carrier comprising a material with a melting point that is at least substantially known, the spring carrier configured to:

house the first and second springs when a temperature of the torque limiting device is below the melting point; and at least substantially disable the first and second springs after the temperature of the torque limiting device has exceeded the melting point.

19. The torque limiting device of claim 18, wherein the slip device comprises a ball and ramp device.

20. The torque limiting device of claim 18, further comprising:

an adjustment device coupled to the first and second springs and configured to allow the user to move the first and second springs, and to thereby adjust the first spring force and the second spring force, respectively;

wherein the second spring only exerts the second spring force against the second rotational plate if the adjustment device is tightened by at least a predetermined threshold amount.

* * * * *